United States Patent
Chu et al.

(10) Patent No.: US 11,687,119 B2
(45) Date of Patent: Jun. 27, 2023

(54) FLEXIBLE SCREEN DISPLAY DEVICE

(71) Applicant: BOE Technology Group Co., Ltd., Beijing (CN)

(72) Inventors: Shangchieh Chu, Beijing (CN); Xiaofei Luo, Beijing (CN); Zhe Yang, Beijing (CN); Junhuan Liu, Beijing (CN); Shouchuan Zhang, Beijing (CN); Xinyu Wang, Beijing (CN); Hong Zhu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/341,724

(22) Filed: Jun. 8, 2021

(65) Prior Publication Data
US 2022/0164001 A1   May 26, 2022

(30) Foreign Application Priority Data

Nov. 20, 2020   (CN) .......................... 202011315386.7

(51) Int. Cl.
    *G06F 1/16*   (2006.01)
(52) U.S. Cl.
    CPC .......... *G06F 1/1652* (2013.01); *G06F 1/1656* (2013.01)
(58) Field of Classification Search
    CPC .... G06F 1/1652; G06F 1/1624; G06F 1/1601; G06F 1/1641; G06F 1/1607; G06F 1/1616; G06F 1/1626; H05K 5/023; H05K 5/03
    See application file for complete search history.

(56) References Cited

U.S. PATENT DOCUMENTS

| | | | |
|---|---|---|---|
| 10,015,897 B1 | 7/2018 | Hong et al. | |
| 10,742,784 B1 | 8/2020 | Jo et al. | |
| 11,170,671 B1* | 11/2021 | Han | G06F 1/1601 |
| 11,301,001 B2* | 4/2022 | Myoung | G09F 9/301 |
| 2013/0058063 A1* | 3/2013 | O'Brien | G06F 1/1624 |
| | | | 361/807 |
| 2016/0120022 A1 | 4/2016 | Lee et al. | |
| 2017/0013726 A1* | 1/2017 | Han | H05K 1/028 |
| 2017/0023978 A1* | 1/2017 | Cho | G06F 1/1656 |
| 2017/0038798 A1 | 2/2017 | Lee | |

(Continued)

FOREIGN PATENT DOCUMENTS

| CN | 1136194 A | 11/1996 |
|---|---|---|
| CN | 201655172 U | 11/2010 |

(Continued)

OTHER PUBLICATIONS

CN 2020113153867 first office action.

*Primary Examiner* — Abhishek M Rathod
(74) *Attorney, Agent, or Firm* — IPro, PLLC (57) ABSTRACT

A flexible screen display device includes: a hollow housing having an opening; a receiving shaft fixed inside the housing; a first guiding shaft fixed inside the housing; a second guiding shaft fixed inside the housing; a flexible screen, one end of which is connected to the receiving shaft, and the other end of which sticks out of the opening via the first guiding shaft and the second guiding shaft to deploy or receive the flexible screen. The first guiding shaft is close to the receiving shaft with respect to the second guiding shaft, and the flexible screen forms a one-time guided bending section via the first guiding shaft and the second guiding shaft.

17 Claims, 6 Drawing Sheets

(56) References Cited

U.S. PATENT DOCUMENTS

| | | | |
|---|---|---|---|
| 2017/0156220 A1* | 6/2017 | Heo | H05K 5/0017 |
| 2017/0196102 A1* | 7/2017 | Shin | G06F 1/1607 |
| 2017/0318688 A1 | 11/2017 | Kim et al. | |
| 2017/0332478 A1* | 11/2017 | Choi | G06F 1/1652 |
| 2018/0049328 A1* | 2/2018 | Choi | G06F 1/1652 |
| 2018/0098440 A1* | 4/2018 | Choi | G06F 1/1652 |
| 2018/0103551 A1* | 4/2018 | Park | H05K 5/0217 |
| 2019/0182947 A1 | 6/2019 | Xiang et al. | |
| 2019/0297736 A1 | 9/2019 | Xu et al. | |
| 2020/0221585 A1* | 7/2020 | Cho | H05K 5/0217 |
| 2020/0394942 A1* | 12/2020 | Kim | G06F 1/1652 |

FOREIGN PATENT DOCUMENTS

| | | |
|---|---|---|
| CN | 105609523 A | 5/2016 |
| CN | 107067981 A | 8/2017 |
| CN | 107731098 A | 2/2018 |
| CN | 108230937 A | 6/2018 |
| CN | 110322792 A | 10/2019 |
| CN | 209859509 U | 12/2019 |
| CN | 111508363 A | 8/2020 |
| KR | 20200124989 A | 11/2020 |

\* cited by examiner

FLEXIBLE SCREEN DISPLAY DEVICE

CROSS-REFERENCE TO RELATED APPLICATIONS

The present application claims priority to Chinese Patent Application No. 202011315386.7 filed in China on Nov. 20, 2020 which is incorporated herein by reference in its entirety.

TECHNICAL FIELD

The present disclosure relates to the field of display technology, and more particularly to a flexible screen display device.

BACKGROUND

As flexible screen applications become more widespread, the variety of flexible screen display devices becomes more diverse.

For example, Patent Document 1 discloses a reel-type display as a display device. Since the reel length of such a reel-type display is the width of a flexible display screen, the display area of the flexible screen is greatly increased and the picture size is increased. The flexible screen in this structure can be telescopic, pulled out when used, and retracted at the end of use, providing great convenience to the user. However, when the flexible screen display device is applied to frequent stretching and contracting, the flexible screen is easily damaged due to the flexible screen being subjected to excessive stress, thereby reducing the service life of the display device.

PATENT LITERATURE

Patent Document 1, CN201655172U.

SUMMARY

In a first aspect of the present disclosure, there is provided a flexible screen display device including: a hollow housing having an opening; a receiving shaft fixed inside the housing; a first guiding shaft fixed inside the housing; a second guiding shaft fixed inside the housing; and a flexible screen, one end of which is connected to the receiving shaft, and the other end of which sticks out of the opening via the first guiding shaft and the second guiding shaft to deploy or receive the flexible screen. And the first guiding shaft is close to the receiving shaft with respect to the second guiding shaft, and the flexible screen forms a one-time guided bending section via the first guiding shaft and the second guiding shaft.

According to some alternative embodiments of the present disclosure, the bending section includes: a first fitting section formed by fitting the flexible screen to the first guiding shaft, a second fitting section formed by fitting the flexible screen to the second guiding shaft, and a non-fitting section between the first fitting section and the second fitting section. And the non-fitting section forms an arc bend between the first guiding shaft and the second guiding shaft corresponding to the flexible screen.

According to some alternative embodiments of the present disclosure, the first fitting section has an arc center angle corresponding to the first guiding shaft of less than 90 degrees.

According to some alternative embodiments of the present disclosure, the second fitting section has an arc center angle corresponding to the second guiding shaft of less than 90 degrees.

According to some alternative embodiments of the present disclosure, the arc center angle of the first fitting section corresponding to the first guiding shaft and the arc center angle of the second fitting section corresponding to the second guiding shaft are both less than 90 degrees.

According to some alternative embodiments of the present disclosure, the bending angle of the bending section is less than 90 degrees.

According to some alternative embodiments of the present disclosure, the first guiding shaft and the second guiding shaft rotate in a same direction in synchronization.

According to some alternative embodiments of the present disclosure, the flexible screen display device further includes a synchronization wheel set, the synchronization wheel set including a first driving wheel provided on the first guiding shaft, a second driving wheel provided on the second guiding shaft, and a fifth wheel provided between and connecting the first driving wheel and the second driving wheel. And the fifth wheel is engaged with the first driving wheel and the second driving wheel, respectively.

According to some alternative embodiments of the present disclosure, the first driving wheel and the second driving wheel have a same radius.

According to some alternative embodiments of the present disclosure, the flexible screen display device further includes: a first driving wheel provided on the first guiding shaft, a second driving wheel provided on the second guiding shaft, and a belt connecting the first driving wheel and the second driving wheel.

According to some alternative embodiments of the present disclosure, the first driving wheel and the second driving wheel have a same radius.

According to some alternative embodiments of the present disclosure, a radius of the first driving wheel is greater than a radius of the second driving wheel.

According to some alternative embodiments of the present disclosure, the flexible screen display device further includes a received state sensor for sensing that the flexible screen is in a received state or in a deployed state; the housing further includes a see-through display area corresponding to a position between the opening and the second guiding shaft; a display region of the flexible display screen corresponding to the see-through display area presents display content in response to the received state sensed by the receiving sensor.

In a second aspect of the present disclosure, there is provided a flexible screen display device including: a hollow housing having an opening; a receiving shaft fixed inside the housing; a plurality of guiding shafts fixed inside the housing; and a flexible screen, one end of which is connected to the receiving shaft, and the other end of which sticks out of the opening via the plurality of guiding shafts to deploy or receive the flexible screen. And the flexible screen forms a one-time guided bending section via the plurality of guiding shafts.

According to some alternative embodiments of the present disclosure, the bending angle of the bending section is less than 90 degrees.

According to some alternative embodiments of the present disclosure, each of the plurality of guiding shafts rotates in a same direction in synchronization with each other.

According to some alternative embodiments of the present disclosure, the flexible screen display device further includes a synchronization wheel set, the synchronization wheel set including a plurality of driving wheels respectively provided on the plurality of guiding shafts, and a plurality of fifth wheels provided between and connecting each adjacent pair of the plurality of driving wheels. And a number of the fifth wheel is one less than a number of the guiding shafts; and each of the plurality of fifth wheels is engaged with a respective pair of driving wheels.

According to some alternative embodiments of the present disclosure, all the plurality of driving wheels have a same radius.

According to some alternative embodiments of the present disclosure, not all the plurality of driving wheels have a same radius.

According to some alternative embodiments of the present disclosure, the flexible screen display device further includes a received state sensor for sensing that the flexible screen is in a received state or in a deployed state; the housing further includes a see-through display area corresponding to a position between the opening and the plurality of guiding shafts; a display region of the flexible display screen corresponding to the see-through display area presents display content in response to the received state sensed by the receiving sensor.

BRIEF DESCRIPTION OF THE DRAWINGS

In order to more clearly illustrate the technical solutions of the embodiments of the present disclosure, a brief description will be given below of the drawings that are required to be used in the description of the embodiments. It is obvious that the drawings in the following description are only some embodiments of the present disclosure, and those skilled in the art can obtain other drawings according to these drawings without involving any inventive effort.

DETAILED DESCRIPTION

In order to more clearly illustrate this disclosure, a further description of the disclosure is provided below in connection with the preferred embodiments and the appended drawings. Similar components in the drawings are denoted by the same reference numerals. It should be understood by those skilled in the art that the following detailed description is illustrative and not restrictive, and is not intended to limit the scope of the present disclosure.

It is noted that in the description of the present application, relational terms such as first and second, and the like are used solely to distinguish one entity or action from another entity or action without necessarily requiring or implying any actual such relationship or order between such entities or actions. Moreover, the terms "comprise", "include" or any other variation thereof, are intended to cover a non-exclusive inclusion, such that a process, method, article, or means that includes a list of elements does not comprise only those elements but comprise other elements not expressly listed or inherent to such process, method, article, or means. An element proceeded by the statement "comprises a . . . " does not, without more constraints, preclude the existence of additional identical elements in the process, method, article, or means that includes the element.

Figure 2A:
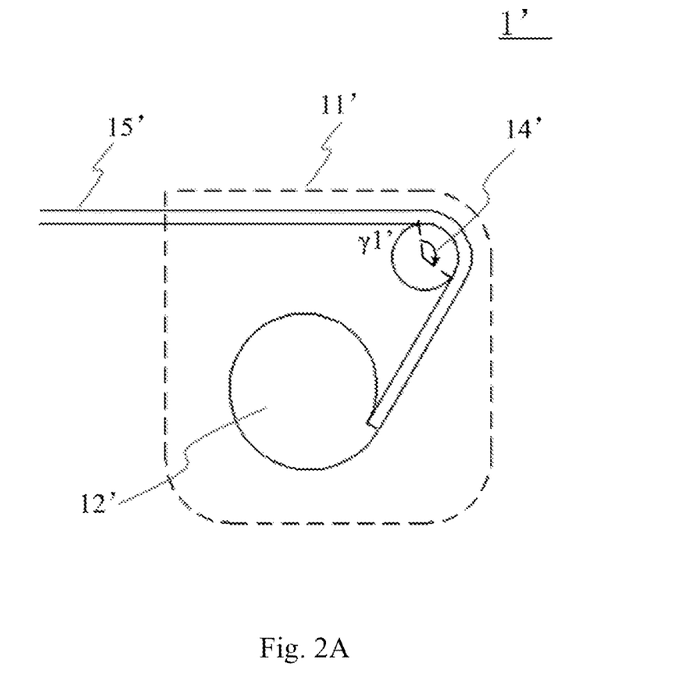
FIGS. 2A and 2B show schematic structural views of a flexible screen display device in accordance with the related art.
Figure 2B:
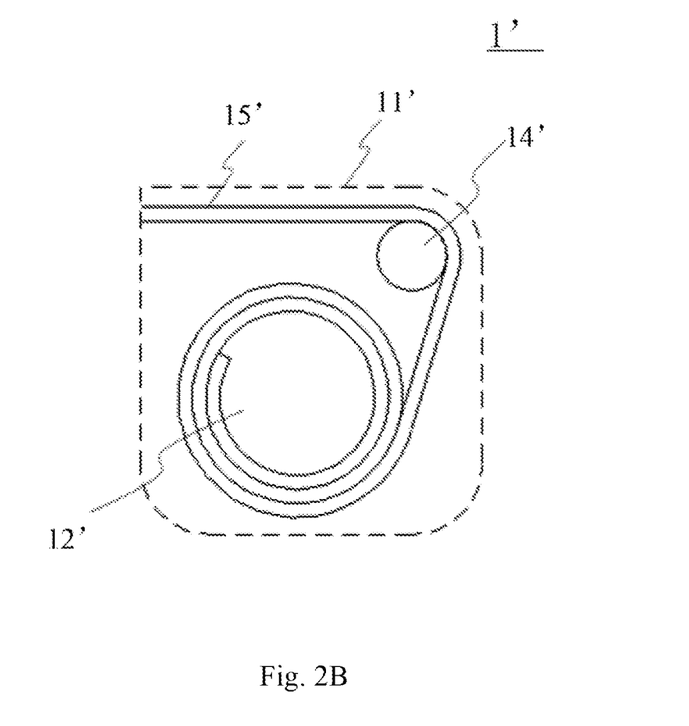

As shown in FIG. 2A, the flexible screen display device 1' of the related art has a structure in which one end of the flexible screen 15' is connected to a receiving shaft 12' and the other end sticks out of an opening of a housing 11'. As shown in FIG. 2B, when the flexible screen 15' is in the rolled state, the flexible screen 15' is wound around the receiving shaft from one end connected to the receiving shaft 12'. A guiding shaft 14' is provided in the housing 11', and when the flexible screen 15' is deployed or contracted, the flexible screen 15' fits the outside of the guiding shaft 14' to move, and the guiding shaft 14' changes the moving direction of the flexible screen 15' during stretching or rolling, so that the space required for storing the flexible screen can be reduced and the space efficiency can be improved. However, since the flexible screen 15' is in a bent state when passing through the guiding shaft 14', the flexible screen is easily damaged after the flexible screen is frequently stretched or contracted.

Figure 3A:
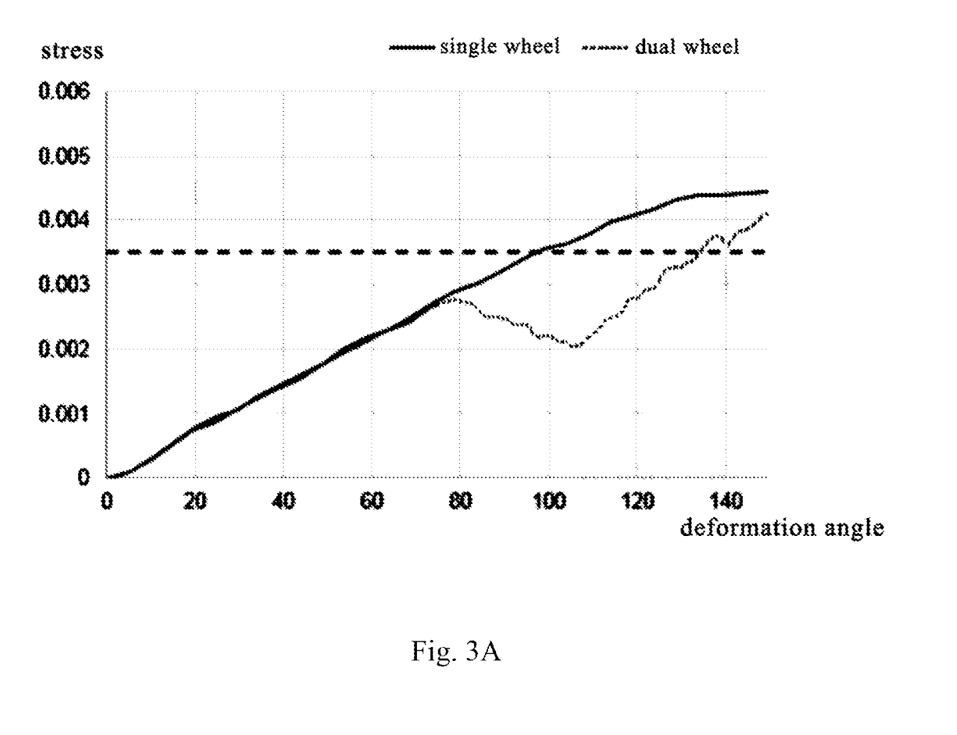
FIG. 3A shows a graph illustrating a difference of deformation angle versus bending stress between a flexible screen in accordance with the related art and another flexible screen in accordance with embodiments of the present disclosure during bending.
Figure 3B:
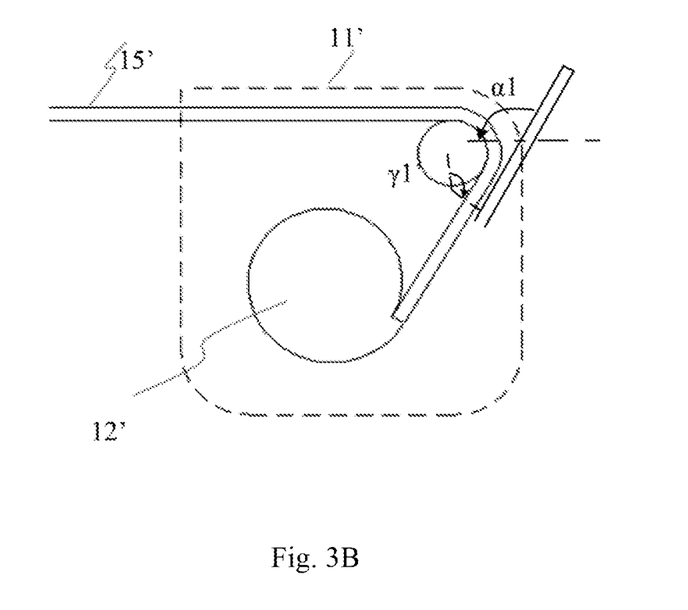
FIG. 3B shows a schematic view of the deformation of a flexible screen in accordance with the related art during bending.

In view of the above problems, the inventors have made extensive studies and experiments and found that, as shown in FIGS. 3A and 3B, with reference to FIG. 2, take the deploying process of the flexible screen 15' as an example, with continuous stretching of the flexible screen, during the process of the flexible screen 15' sticking out of the opening through circumventing the guiding shaft 14', the flexible screen 15' transitions from a flat state (i.e. a state in which the flexible screen 15' has departed from the receiving shaft 12' but not yet passed through the guiding shaft 14') into a bending deformation state (i.e. a state in which the flexible screen 15' has departed from the receiving shaft 12' and already passed through the guiding shaft 14'). Therefore, as the deformation angle $\alpha 1$ of the bending deformation of the flexible screen 15' increases, the fitting area between the flexible screen 15' and the guiding shaft 14' increases, and the stress from the guiding shaft due to the bending of the flexible screen increases, so that the deformation between respective layers of the flexible screen increases. Thus, the flexible screen is highly susceptible to the above-mentioned damage problems during bending. To this end, the inventors have further proposed a flexible screen display device to solve the above problems.

Figure 1:
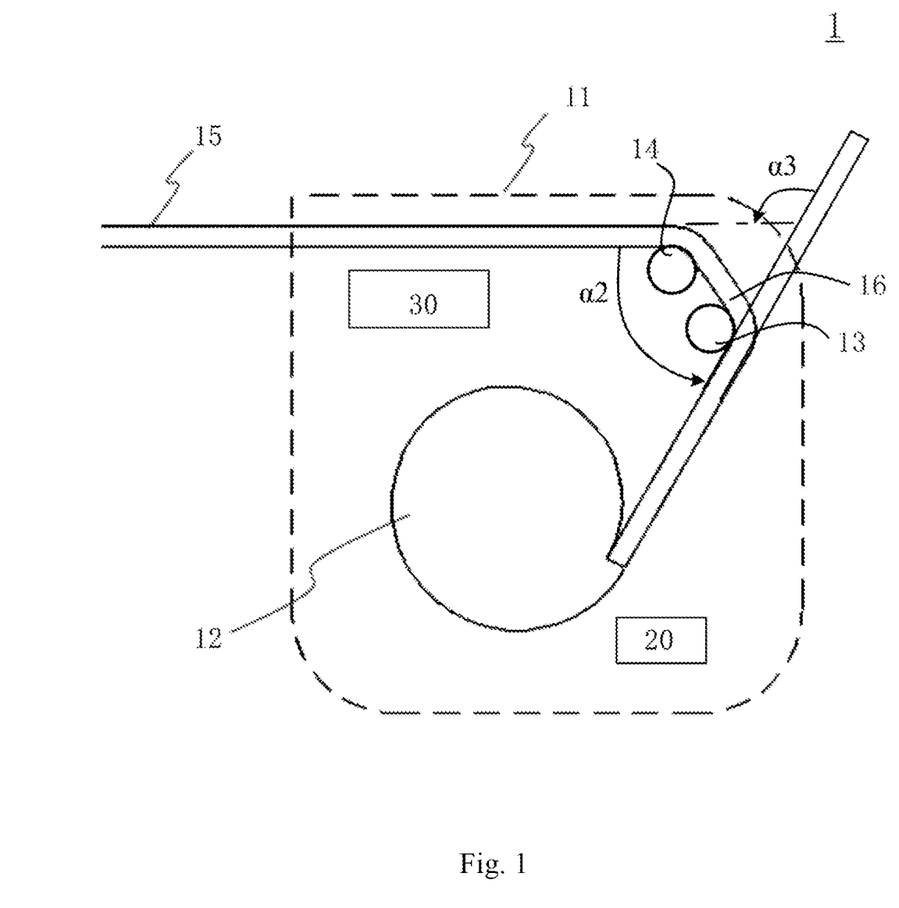
FIG. 1 is a schematic structural view of a flexible screen display device in accordance with one embodiment of the present disclosure.
Figure 4:
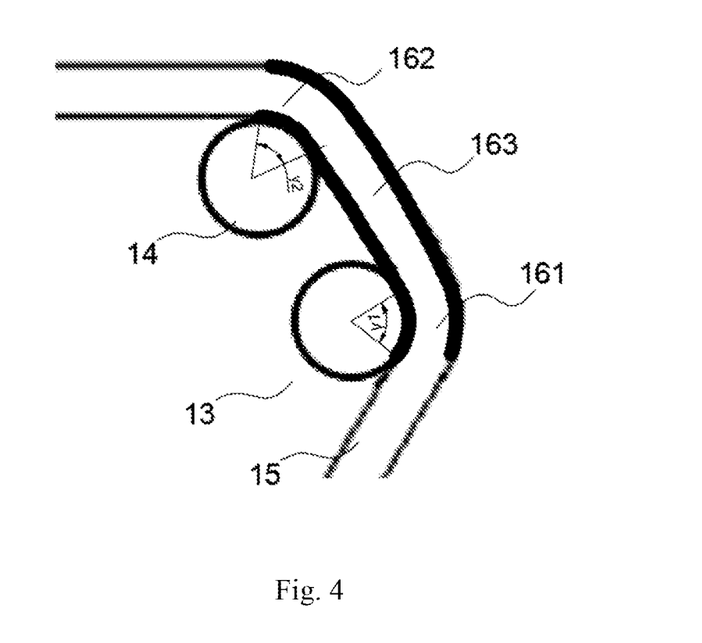
FIG. 4 shows an enlarged view of a bending section of a flexible screen of a flexible screen display device in accordance with an embodiment of the present disclosure.

As shown in FIGS. 1 and 4, one embodiment of the present disclosure provides a flexible screen display device 1 that includes: a hollow housing 11 having an opening; a receiving shaft 12 fixed inside the housing 11; a first guiding shaft 13 fixed inside the housing 11; a second guiding shaft 14 fixed inside the housing 11; and a flexible screen 15, one end of which is connected to the receiving shaft 12, and the other end of which sticks out of the opening via the first guide shaft 13 and the second guide shaft 14 to deploy or receive the flexible screen 15. And the first guiding shaft 13 is close to the receiving shaft 12 with respect to the second guiding shaft 14, and the flexible screen 15 forms a one-time guided bending section 16 via the first guiding shaft 13 and the second guiding shaft 14.

In the present embodiment, as shown in FIGS. 1 and 4, the flexible screen 15 forms the one-time guided bending section 16 via the first guiding shaft 13 and the second guiding shaft 14, i.e. the flexible screen maintains one-time bent via the two guiding shafts 13, 14, effectively reducing stress from the guiding shafts due to bending by two fitting positions with the two guiding shafts.

In an alternative embodiment, as shown in FIG. 1, the bending angle $\alpha 2$ of the bending section is less than 90 degrees, i.e. the bending angle of the bending section is an acute angle.

As shown in FIG. 1, in the present embodiment, the flexible screen 15 is one-time bent by the first guiding shaft 13 and the second guiding shaft 14, and during the process of the flexible screen 15 transitioning from the flat state to the bent deformation state. Specifically, the flexible screen 15 in the present embodiment is bent at a deformation angle of $\alpha 3$ when being fitted with the first guiding shaft 13 and the second guiding shaft 14. As shown in FIG. 3B, during the process of the flexible screen 15' of the related art transitioning from the flat state to the bent deformation state, the flexible screen 15' of the related art is bent at a deformation angle of $\alpha 1$ when being fitted with the guiding shaft 14'.

As shown in FIG. 3A, comparing with the stress curve increasing with the deformation angle of $\alpha 1$ at which the flexible screen 15 of the related art is bent when being fitted with the guiding shaft 14' (specifically, see the stress curve shown by a solid line in FIG. 3A), in the process in which the flexible screen 15 of the present embodiment is continuously bent to form the bending section 16 (specifically, see the stress curve shown by a dot line in FIG. 3A), when the flexible screen 15 passes through the first guiding shaft 13 and then the second guiding shaft 14, the bending stress is dispersed, which shows that the stress value to which the flexible screen 15 is subjected in FIG. 3A suddenly decreases in the rising stage. As the flexible screen 15 continues to stretch, the second guiding shaft 14 further disperses the stress to which the flexible screen 15 is subjected as the deformation angle of $\alpha 3$ increases, as shown by the continuous decrease in terms of the stress to which the flexible screen 15 is subjected in FIG. 3A, which turns upward and increases as the deformation angle of $\alpha 3$ increases as the deformation angle of $\alpha 3$ reaches an extreme value of 105 degrees, which shows that the stress value to which the flexible screen 15 is subjected in FIG. 3A gradually increases. Therefore, it can be seen from a comparison of the effects of FIG. 3A that, as the deformation angle of $\alpha 3$ increases, the stress to which the flexible screen according to the present embodiment is subjected effectively decreases after forming the bending section 16.

It should be noted that, as shown in FIG. 1, the flexible screen of the present embodiment transitions from a flat state to a bent state after being bent once, and during the bending process, the deformation angle of $\alpha 3$ of the flexible screen gradually increases, and correspondingly, the bending angle of $\alpha 2$ of the flexible screen gradually decreases, namely, the deformation angle of $\alpha 3$ and the bending angle of $\alpha 2$ of the bending section 16 in the present embodiment are complementary angles.

Therefore, in the embodiment of the present disclosure, on the basis of adjusting the movement angle of the flexible screen and saving the overall receiving space of the flexible screen, the flexible screen is passed through the first guiding shaft and the second guiding shaft via two guiding shafts to form a one-time guided bending section, and the first guiding shaft and the second guiding shaft provide two supports corresponding to the bending section. Thus, stress concentration caused by excessive bending of the flexible screen is avoided, stress concentration caused by bending of the flexible screen is effectively reduced, and the service life of the flexible display device is improved.

In an alternative embodiment, as shown in the enlarged view of the bending section 16 of the flexible screen 15 shown in FIG. 4, the bending section 16 includes: a first fitting section 161 formed by fitting the flexible screen 15 to the first guiding shaft 13, a second fitting section 162 formed by fitting the flexible screen 15 to the second guiding shaft 14, and a non-fitting section 163 between the first fitting section 161 and the second fitting section 162. Also, the non-fitting section 163 forms an arc bend between the first guiding shaft 13 and the second guiding shaft 14 corresponding to the flexible screen 15.

In the present embodiment, as shown in FIG. 4, taking the deploying process of the flexible screen 15 as an example, the flexible screen 15 circumvents the outside of the first guiding shaft 13 to form a first fitting section 161 fitting to the circumferential side wall of the first guiding shaft 13, and during the movement of the flexible screen 15, the flexible screen 15 also circumvents the outside of the second guiding shaft 14 to form a second fitting section 162 fitting to the circumferential side wall of the guiding shaft. The flexible screen 15 between the first fitting section 161 and the second fitting section 162 is a non-fitting section 163, that is, the non-fitting section 163 does not fit the circumferential side wall of the first guiding shaft 13 and the circumferential side wall of the second guiding shaft 14. Therefore, at the bending section 16 of the flexible screen 15, the first guiding shaft 13 and the second guiding shaft 14 provide the flexible screen 15 with support portions of two fitting sections, namely, the first fitting section 161 and the second fitting section 162, through which the stress during the movement of the flexible screen is dispersed, thereby achieving the effect of dispersing the stress and further improving the service life of the flexible screen display device.

In an alternative embodiment, as shown in FIG. 4, the first fitting section 161 has an arc center angle $\gamma 1$ of less than 90 degrees corresponding to the first guiding shaft 13; and the second fitting section 162 has an arc center angle $\gamma 2$ of less than 90 degrees corresponding to the second guiding shaft 14.

In the present embodiment, it is further defined that the first fitting section 161 of the first guiding shaft 13 and the flexible screen corresponds to the arc center angle of the first guiding shaft 13 and the second fitting section 162 of the second guiding shaft 14 and the flexible screen corresponds to the arc center angle of the first guiding shaft 14 in consideration of the issue of more effectively reducing the stress to which the flexible screen is subjected using the first guiding shaft 13 and the second guiding shaft 14. The stress to which the flexible screen is subjected can be further reduced when the angle of the arc centers of both are less than 90 degrees.

Furthermore, as shown in FIG. 2A, the related art forms a bending section of the flexible screen 15' fitting the guiding shaft 14' by means of a guiding shaft 14', the arc center angle γ1' of the bending section corresponding to the guiding shaft being much larger than 90 degrees, namely, the flexible screen 15' and the guiding shaft 14' form a semi-enclosed state. With this arrangement, it can be seen from the stress curve in FIG. 3A that the stress to which the flexible screen 15' is subjected at the bending section from the guiding shaft 14' increases, resulting in that the stress of each layer of the flexible screen is concentrated at the bending section, thereby easily causing damage to the flexible screen 15'.

Therefore, the arc center angle γ1 of the first fitting section 161 of the present embodiment corresponding to the first guiding shaft 13 is set to be less than 90 degrees, and the arc center angle γ2 of the second fitting section 162 corresponding to the second guiding shaft 14 is set to be less than 90 degrees, so that each guiding shaft which each fitting section fits can uniformly disperse the stress to which the bent flexible screen is subjected due to bending. Thus, stress concentration caused by excessive bending of the flexible screen is avoided, stress concentration caused by bending of the flexible screen is effectively reduced, and the service life of the flexible display device is improved.

Considering that the present embodiment uses two guiding shafts for guiding the flexible screen 15, in an alternative embodiment the first guiding shaft 13 and the second guiding shaft 14 rotates in a same direction in synchronization.

In the present embodiment, as shown in FIGS. 1 and 4, the two guiding wheels rotates in a same direction in synchronization during the movement of the flexible screen 15. For example, when the flexible screen 15 is deployed, the area of the flexible screen 15 outside the opening becomes larger and larger, and the rolled flexible screen 15 inside the housing 11 moves in the counterclockwise direction to stick out of the opening after being bent once by the first guiding shaft 13 and the second guiding shaft 14. In the process, the first guiding shaft 13 and the second guiding shaft 14 rotate in the counterclockwise direction as the flexible screen 15 rotates. In the present embodiment, on the basis that the first guiding shaft 13 and the second guiding shaft 14 form two supports for the bending section, slippage between the flexible screen and the guiding wheel is prevented by the two guiding shafts rotating in the same direction in synchronization, and the phenomenon that the flexible screen is wrinkled during movement is effectively prevented.

Figure 5:
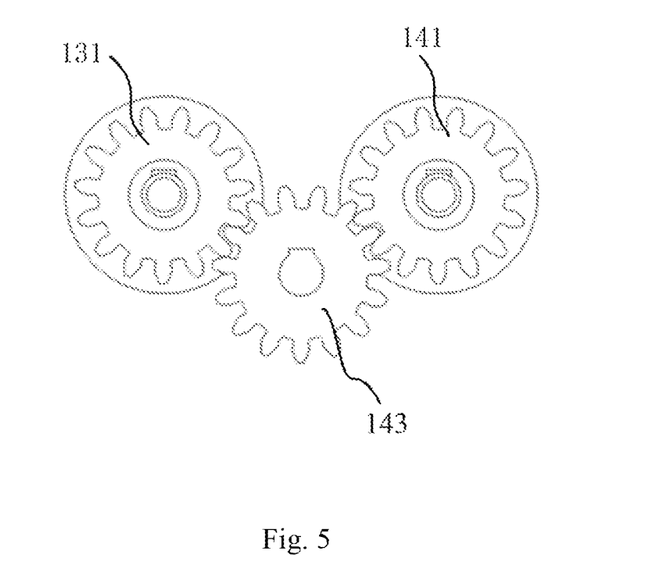
FIG. 5 shows a schematic view of a synchronization wheel set of a flexible screen display device in accordance with an embodiment of the present disclosure.

In an alternative embodiment, as shown in FIG. 5, the display device further includes a synchronization wheel set including a first driving wheel 131 provided on the first guiding shaft 13, a second driving wheel 141 provided on the second guiding shaft 14, and a fifth wheel 143 provided between and connecting the first driving wheel 131 and the second driving wheel 141, the fifth wheel 143 is engaged with the first driving wheel 131 and the second driving wheel 141, respectively.

In the present embodiment, the synchronized movement of the first guiding shaft 13 and the second guiding shaft 14 is achieved by means of a synchronization wheel set. Specifically, in an alternative embodiment, the first driving wheel 131 and the second driving wheel 141 have a same radius. The first driving wheel 131 and the second driving wheel 141 are engaged by a fifth wheel 143 located between them and the two achieve rotating in the same direction in synchronization. Further, the first driving wheel 131 drives the first guiding shaft 13 to rotate, and the second driving wheel 141 drives the second guiding shaft 14 to rotate. Thus, the first guiding shaft 13 and the second guiding shaft 14 rotate in the same direction in synchronization to prevent phenomenon that the flexible screen is wrinkled during movement.

In another example, the first guiding shaft 13 and the second guiding shaft 14 increase in length as the width dimension of the flexible screen 15 is larger. At this time, a synchronization wheel set may be provided at both ends of the first guiding shaft 13 and the second guiding shaft 14, respectively. That is, the same first driving wheels 131 are provided on both sides of the first guiding shaft 13, the same second driving wheels 141 are provided on both sides of the second guiding shaft 14, and a fifth wheel 143 is provided between each first driving wheel 131 and each second driving wheel 141, respectively. In the art, the design of the synchronization wheel set is performed according to practical applications, and the design criterion is also to satisfy that the first driving wheel 131 and the second driving wheel 141 rotate in the same direction in synchronization.

Figure 6:
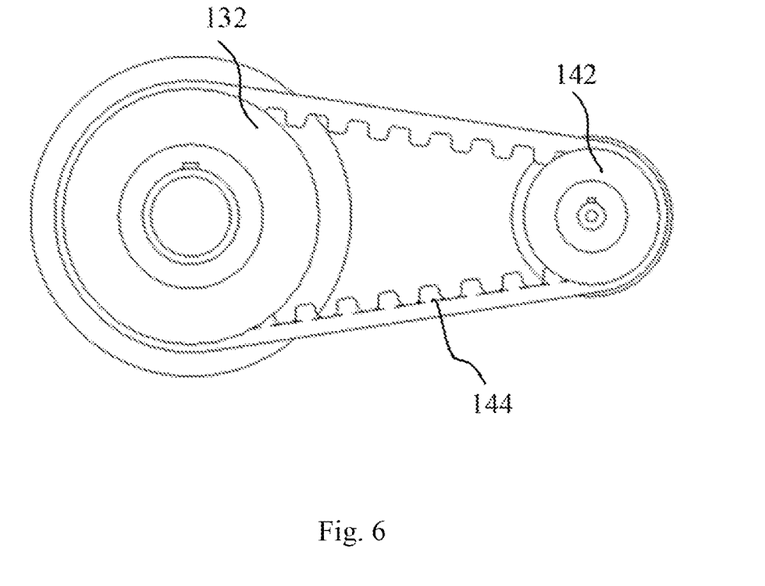
FIG. 6 shows a schematic view of a pulley set of a flexible screen display device in accordance with one embodiment of the present disclosure.

In another alternative embodiment, as shown in FIG. 6, the display device further includes a first driving wheel 132 provided on the first guiding shaft 13 (not shown in FIG. 6), a second driving wheel 142 provided on the second guiding shaft 14 (not shown in FIG. 6), and a belt 144 connecting the first driving wheel 132 and the second driving wheel 142. In the present embodiment, the first driving wheel 132 and the second driving wheel 142 are connected via a belt 144 to realize synchronous rotation, the first driving wheel 132 drives the first guiding shaft 13 to rotate, and the second driving wheel 142 drives the second guiding shaft 14 to rotate, thereby realizing synchronous rotation of the first guiding shaft 13 and the second guiding shaft 14 in the same direction, and avoiding the phenomenon that the flexible screen is wrinkled during movement.

Figure 8:
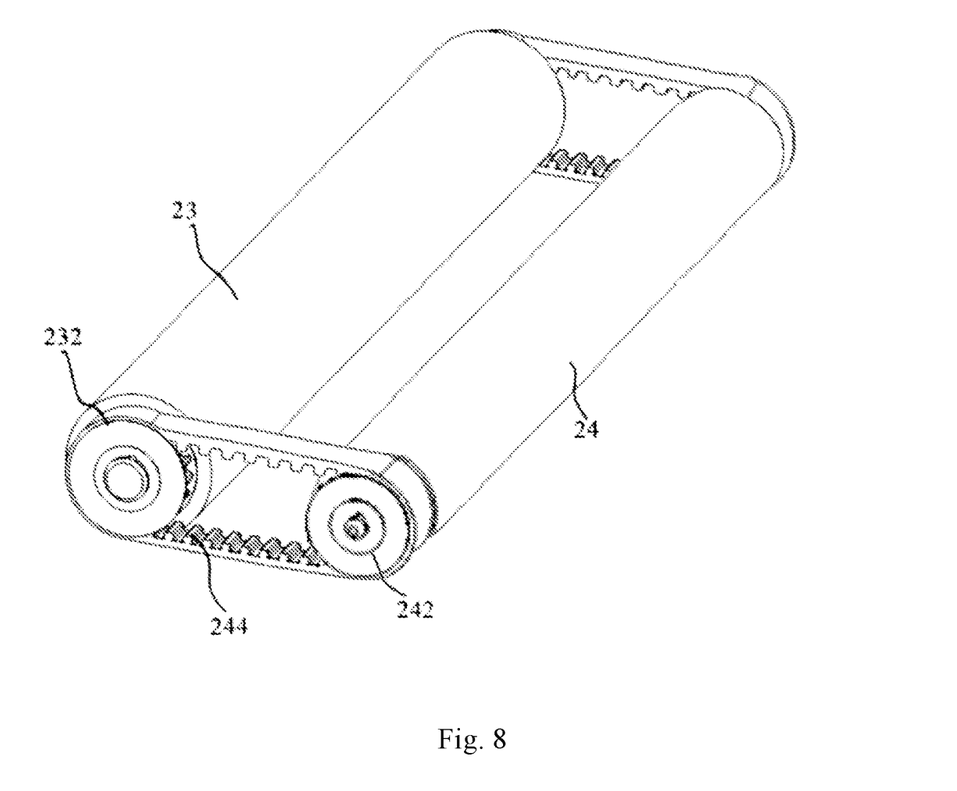
FIG. 8 shows another schematic view of a pulley set of a flexible screen display device in accordance with yet another embodiment of the present disclosure.
Figure 9:
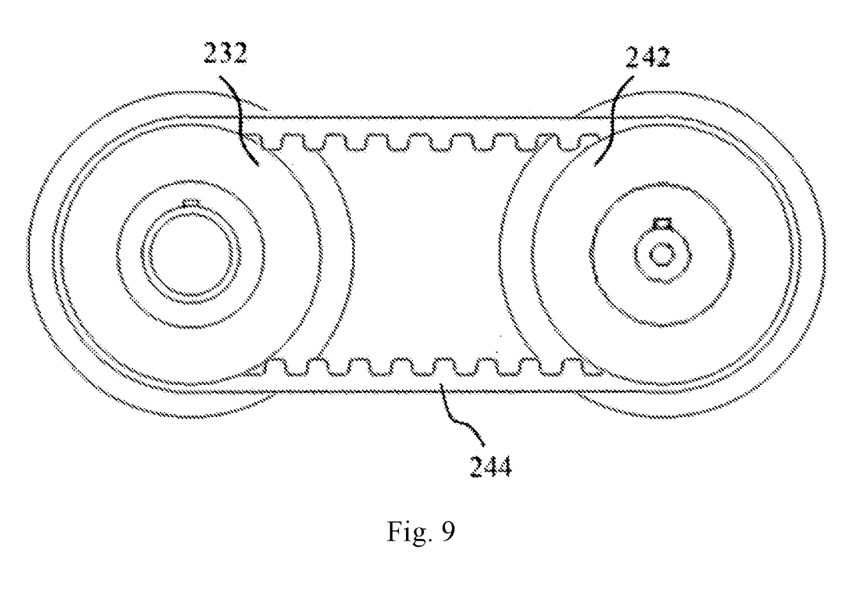
FIG. 9 shows another schematic view of a pulley set of a flexible screen display device in accordance with yet still another embodiment of the present disclosure.

In an alternative embodiment, as illustrated in FIG. 8 and FIG. 9, the radii of the first driving wheel 232 and the second driving wheel 242 are the same based on the provision of a belt 244 wheel connecting the first driving wheel 232 and the second driving wheel 242. In the present embodiment, the first driving wheel 232 and the second driving wheel 242 are connected via a belt 244 to realize synchronous rotation, the first driving wheel 232 drives the first guiding shaft 23 to rotate, and the second driving wheel 242 drives the second guiding shaft 24 to rotate, thereby realizing synchronous rotation of the first guiding shaft 23 and the second guiding shaft 24 in the same direction, and avoiding the phenomenon that the flexible screen is wrinkled during movement.

Figure 7:
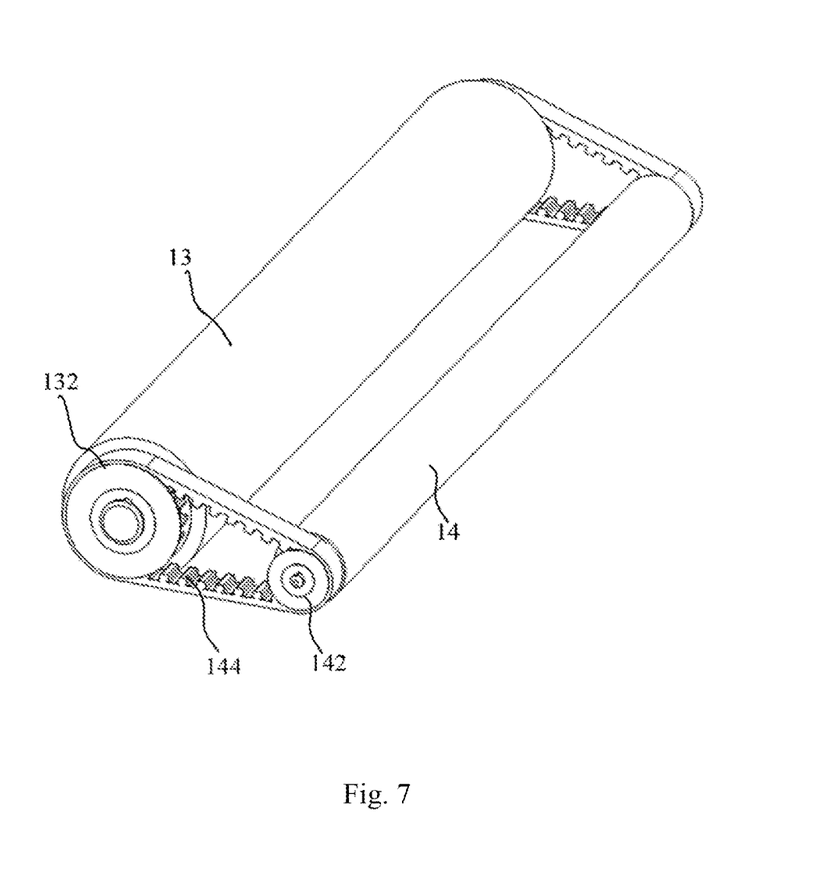
FIG. 7 shows a schematic view of a pulley set of a flexible screen display device in accordance with another embodiment of the present disclosure.

In another alternative embodiment, as illustrated in FIG. 6 and FIG. 7, the radius of the first driving wheel 132 is greater than the radius of the second driving wheel 142. In the present embodiment, since the first driving wheel 132 near the receiving shaft 12 is subjected to a larger stress, and the smaller the radius, the more concentrated the stress the driving wheel is subjected to, the present embodiment provides the first driving wheel 132 with a larger radius, further solving the problem of stress concentration during bending of the flexible screen.

In another example, when the width direction (i.e. the direction perpendicular to the deploying or receiving direction of the flexible screen 15) of the flexible screen 15 is large, the length of the first guiding shaft 13 and the second guiding shaft 14 increases. At this time, as shown in FIG. 7, a pulley set may be provided at both ends of the first guiding shaft 13 and the second guiding shaft 14, respectively. That is, two identical first driving wheels 132 are provided on both sides of the first guiding shaft 13, two identical second driving wheels 142 are provided on both sides of the second guiding shaft 14, and each of the first driving wheels 132 and each of the second driving wheels 142 is respectively connected by a belt 144. In the art, the design of the synchronization wheel set is performed according to practical applications, and the design criterion is also to satisfy that the first driving wheel 132 and the second driving wheel 142 rotate in the same direction in synchronization.

Note that FIGS. 5 to 7 show only the connection relationship between the first driving wheel and the second driving wheel, and do not show the positional relationship between the first driving wheel and the second driving wheel in the present embodiment.

Note that FIG. 6 and FIG. 7 illustrate an arrangement where a radius of the first driving wheel 132 is greater than a radius of the second driving wheel 142, whilst FIG. 8 and FIG. 9 illustrate another arrangement where a radius of the first driving wheel 232 is the same as a radius of the second driving wheel 242.

In an alternative embodiment, as shown in FIG. 1, the display device further includes a received state sensor 20 for sensing whether the flexible screen 15 is in a received state or in a deployed state.

In addition, as shown in FIG. 1, the housing 11 further includes a see-through display area 30 corresponding to a position between the opening (opening of the housing 11) and the second guiding shaft 14; a display region of the flexible display screen 15 corresponding to the see-through display area 30 presents display content in response to the received state sensed by the receiving sensor 20.

In the present embodiment, the display frame of the flexible screen 15 in the rolled and deployed state and the size of the external flexible screen 15 are optimally displayed by sensing the current deployed or received state of the flexible screen 15 by the received state sensor 20, thereby effectively improving the display effect of the flexible screen during rolling and deploying.

Therefore, in the embodiment of the present disclosure, on the basis of changing the movement direction of the flexible screen and saving the overall receiving space of the flexible screen, the flexible screen is passed through the first guiding shaft and the second guiding shaft via two guiding shafts to form a one-time guided bending section, and the first guiding shaft and the second guiding shaft provide two supports corresponding to the bending section. Thus, stress concentration caused by excessive bending of the flexible screen is avoided, stress concentration caused by bending of the flexible screen is effectively reduced, and the service life of the flexible display device is improved.

In addition, although only two guiding shafts of the first guiding shaft and the second guiding shaft are shown in the respective embodiments of the present disclosure, those skilled in the art will appreciate that the number of the guiding shafts is not limited to two, but may be set to three, four, or even more according to actual needs, provided that the problem of stress concentration due to excessive bending of the flexible screen can be avoided. These modifications are not described in detail herein.

It is to be understood that the above-described embodiments of the present disclosure are merely illustrative of and not restrictive on the implementations of the present disclosure, and that various other changes and modifications may be made by those skilled in the art in light of the above teachings, and that all implementations are not exhaustive, and obvious modifications or variations are possible in light of the above teachings.

What is claimed is:

1. A flexible screen display device comprising:
   a hollow housing having an opening;
   a receiving shaft fixed inside the housing;
   a first guiding shaft fixed inside the housing;
   a second guiding shaft fixed inside the housing; and
   a flexible screen, one end of which is connected to the receiving shaft, and the other end of which sticks out of the opening via the first guiding shaft and the second guiding shaft to deploy or receive the flexible screen,
   wherein the first guiding shaft is close to the receiving shaft with respect to the second guiding shaft, and the flexible screen forms a one-time guided bending section via the first guiding shaft and the second guiding shaft;
   wherein the first guiding shaft and the second guiding shaft rotate in a same rotating direction relative to a deploying direction or a receiving direction of the flexible screen; and
   wherein an angle between an extension direction of the flexible screen prior to being guided by the first guiding shaft and an extension direction of the flexible screen subsequent to being guided by the second guiding shaft on a side of facing the first guiding shaft and the second guiding shaft is of an acute angle, wherein the acute angle is of 75 degrees.

2. The flexible screen display device of claim 1, wherein the bending section comprises: a first fitting section formed by fitting the flexible screen to the first guiding shaft, a second fitting section formed by fitting the flexible screen to the second guiding shaft, and a non-fitting section between the first fitting section and the second fitting section,
   wherein the non-fitting section forms an arc bend between the first guiding shaft and the second guiding shaft corresponding to the flexible screen.

3. The flexible screen display device of claim 2, wherein the first fitting section has an arc center angle corresponding to the first guiding shaft of less than 90 degrees.

4. The flexible screen display device of claim 2, wherein the second fitting section has an arc center angle corresponding to the second guiding shaft of less than 90 degrees.

5. The flexible screen display device of claim 2, wherein the arc center angle of the first fitting section corresponding to the first guiding shaft and the arc center angle of the second fitting section corresponding to the second guiding shaft are both less than 90 degrees.

6. The flexible screen display device of claim 1, wherein the bending angle of the bending section is less than 90 degrees.

7. The flexible screen display device of claim 1, wherein the first guiding shaft and the second guiding shaft rotate in a same direction in synchronization.

8. The flexible screen display device of claim 7, further comprising a synchronization wheel set,
   the synchronization wheel set comprising a first driving wheel provided on the first guiding shaft, a second driving wheel provided on the second guiding shaft, and a fifth wheel provided between and connecting the first driving wheel and the second driving wheel,
   wherein the fifth wheel is engaged with the first driving wheel and the second driving wheel, respectively.

9. The flexible screen display device of claim 8, wherein the first driving wheel and the second driving wheel have a same radius.

10. The flexible screen display device of claim 7, further comprising: a first driving wheel provided on the first guiding shaft, a second driving wheel provided on the second guiding shaft, and a belt connecting the first driving wheel and the second driving wheel.

11. The flexible screen display device of claim 10, wherein the first driving wheel and the second driving wheel have a same radius.

12. The flexible screen display device of claim 10, wherein a radius of the first driving wheel is greater than a radius of the second driving wheel.

13. The flexible screen display device of claim 1, further comprising a received state sensor for sensing that the flexible screen is in a received state or in a deployed state;
the housing further comprises a see-through display area corresponding to a position between the opening and the second guiding shaft;
a display region of the flexible display screen corresponding to the see-through display area presents display content in response to the received state sensed by the receiving sensor.

14. A flexible screen display device comprising:
a hollow housing having an opening; a receiving shaft fixed inside the housing;
a plurality of guiding shafts fixed inside the housing; and
a flexible screen, one end of which is connected to the receiving shaft, and the other end of which sticks out of the opening via the plurality of guiding shafts to deploy or receive the flexible screen,
wherein the flexible screen forms a one-time guided bending section via the plurality of guiding shafts;
wherein the plurality of guiding shafts all rotate in a same rotating direction relative to a deploying direction or a receiving direction of the flexible screen; and
wherein an angle between an extension direction of the flexible screen prior to being guided by a guiding shaft among the plurality of guiding shafts and an extension direction of the flexible screen subsequent to being guided by another guiding shaft adjacent to the guiding shaft among the plurality of guiding shafts on a side of facing the plurality of guiding shafts is of an acute angle, wherein the acute angle is of 75 degrees.

15. The flexible screen display device of claim 14, wherein the bending angle of the bending section is less than 90 degrees.

16. The flexible screen display device of claim 14, wherein each of the plurality of guiding shafts rotates in a same direction in synchronization with each other.

17. The flexible screen display device of claim 14, further comprising a received state sensor for sensing that the flexible screen is in a received state or in a deployed state;
the housing further comprises a see-through display area corresponding to a position between the opening and the plurality of guiding shafts;
a display region of the flexible display screen corresponding to the see-through display area presents display content in response to the received state sensed by the receiving sensor.

* * * * *